Feb. 6, 1934.  G. L. LANG  1,945,942
CAMERA FLASH LIGHT ATTACHMENT
Filed April 16, 1932
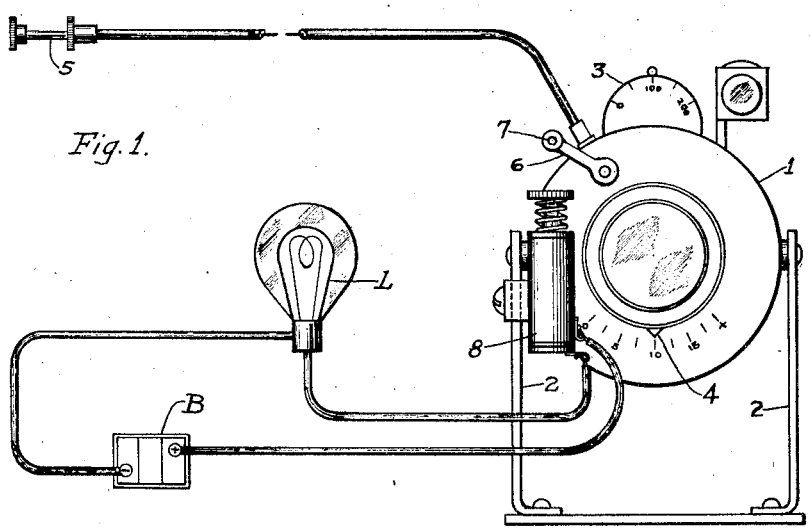
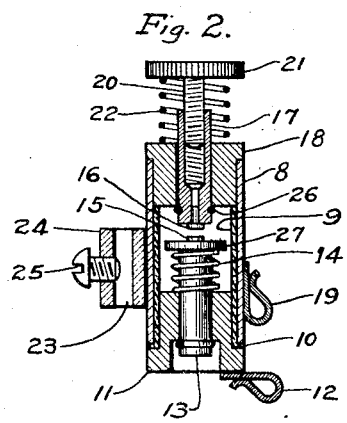
Inventor
George L. Lang
Attorney
A. D. T. Libby Patented Feb. 6, 1934

1,945,942

UNITED STATES PATENT OFFICE 1,945,942

CAMERA FLASH-LIGHT ATTACHMENT

George L. Lang, South Orange, N. J.

Application April 16, 1932. Serial No. 605,577

5 Claims. (Cl. 67—29)

This invention relates to an attachment to be applied to cameras for the purpose of operating a flash-light in synchronism with the camera-shutter whereby better flash-light pictures may be obtained. I am aware that certain schemes have been proposed for setting off a flash-light at the time when the camera-shutter is about to open, but the schemes of which I am aware, are more complicated and expensive, and do not produce proper synchronism between the operation of the shutter and flash-light.

It is the principal object of my invention to provide a small, compact, and inexpensive device which can be readily attached to a camera, and which will positively and accurately actuate a flash-light of any suitable character in proper timed relationship with the camera-shutter.

Another object of my invention is to provide an attachment of the character described by which an accurate adjustment of extreme fineness may be readily made so that perfect synchronism of operation of the shutter and flash-light may be obtained, and thereby a better picture secured.

My improved attachment will be readily understood by reference to the annexed drawing, wherein:

Figure 1 is a plan-view substantially full size of the front end of a camera with the attachment in position and connected to an electrical circuit including a flash-light.

Figure 2 is a sectional-elevational view on an enlarged scale through the contact attachment device.

In the drawing, 1 illustrates the camera lens carried by a frame 2. Associated with the lens 1, are the usual timing device 3 and range control 4. The shutter is also provided with the usual control member 5 supplemented by a control lever 6 which may be operated directly by the hand of the operator, or at a distance by a cord attached to the hole 7 in the shutter lever 6.

My attachment comprises a small casing 8 preferably tubular in shape. Positioned within the casing 8, is a tubular insulator 9 having a collar or shoulder 10 for the purpose of insulating a metal bushing 11 to which is attached a terminal member 12. The bushing 11 carries a member 13 resiliently held in place therein by a spring 14, one end of which engages the flange 27, and the other end resting against the inner end of the bushing 11.

The member 13 carries a contact 15 of any suitable metal, and this contact is adapted to cooperate with a corresponding contact 16 carried by a plunger member 17, held by a snap ring 26, in position in the metal bushing 18 which closes and is fastened to the upper end of the casing 8. A terminal member 19 is attached to the casing 8 whereby an electrical circuit is completed to the contact 16. The member 17 is threaded internally and carries an adjusting screw 20 having a head 21 adapted to be engaged by the end of the shutter lever 6. The screw 20 is held in adjustable position by means of a spring 22, or it may be held by some other form of resilient member. The spring 22 also acts to hold the plunger 17 in the position shown in Figure 2.

The contact attachment device above described, is provided with a bracket 24 having a slot 23 to secure the frame member 2 of the camera. A screw 25 is used to clamp the attachment to the frame member 2.

As shown in Figure 1, a battery B, which may preferably be of the usual compact dry-cell type, is connected in the circuit with a flash-light L, and to the terminals 12 and 19.

Assuming now that the adjusting screw 20 is set so that the contacts 15 and 16 are a proper distance apart, it will be understood that when the shutter lever 6 is actuated, the free end engages the head 21 of the screw 20, forcing this downward; and likewise, the plunger member 17 is moved downward until the contact 16 engages the contact 15 which is also free to move downward against the action of the spring 14. The circuit is thereby closed from the battery B to the flash-light L, which instantly gives a flash. By reason of the adjustment provided on the attachment, the time when the contacts 15 and 16 engage can be controlled with great exactness with the opening of the camera-shutter, which opening occurs just previous to the completion of the full stroke of the shutter-lever 6, it being understood that the lever 6 is actuated by the member 5, or directly by hand, or through the medium of the cord as explained.

From what has been said, it will be observed that the timing of the flash-light can be absolutely and accurately controlled so as to take pictures at all different speeds of the camera-shutter, and that the shutter cannot be tripped without setting off the flash-light, whether it be powder or in the form of a special flash-lamp as indicated.

It will be apparent that the exact details may be varied somewhat without departing from the spirit of my invention or the scope of the appended claims.

Having thus described my invention, what I claim is:

1. A flash-light attachment for a camera having a shutter-lever comprising, a casing, a contact resiliently mounted from one end of the casing, a cooperating contact movably mounted from the other end of the casing, adjustable means for moving the last-mentioned contact, said casing adapted to be mounted on a camera member so said adjustable means is in the path of movement of the shutter-lever, and means for connecting said contacts into a circuit including a source of current and a flash-light.

2. A flash-light attachment for a camera having a shutter-lever comprising, a casing, a bushing in each end of the casing, at least one of said bushings being insulated from the casing, a contact resiliently carried by the insulated bushing, a cooperating contact carried by a slidable member in the other bushing, an adjusting screw resiliently held in adjusted position in said slidable member, said casing adapted to be mounted on a camera member so said adjusting screw is in the path of movement of the shutter-lever, and means for connecting said contacts into a circuit including a source of current and a flash-light.

3. A flash-light attachment for a camera having a shutter-lever comprising, a support member having means for quickly attaching the same to a camera member closely adjacent the shutter, a pair of cooperating contacts carried by said support member, at least one contact being resiliently mounted while the other is movable to engage the first, an adjusting device for predetermining the time of movement of said movable contact, said adjusting device being positioned in the path of movement of the shutter-lever, and means for connecting said contacts into a circuit including a source of current and a flash-light.

4. A flash-light attachment for a camera having a shutter-lever comprising, a support member having means for quickly attaching the same to a camera member closely adjacent the shutter, a pair of cooperating contacts carried by said support member, said contacts having relative movement one with respect to the other, and then movement together, an adjusting device for predetermining the time of movement of said movable contact, said adjusting device being positioned in the path of movement of the shutter-lever, and means for connecting said contacts into a circuit including a source of current and a flash-light.

5. A flash-light attachment for a camera having a shutter-lever comprising, a support member having means for quickly attaching the same to a camera member closely adjacent the shutter, an adjustable device carried by said support member and resiliently held in adjusted position in the path of movement of said shutter-lever, circuit closing contacts carried by said support member and brought into engagement by said adjustable device, said circuit including a source of current and a flash-light.

GEORGE L. LANG.